Oct. 5, 1943.  E. FEINBERG  2,330,876

TEMPERATURE CONTROL APPARATUS

Filed Jan. 30, 1942  2 Sheets-Sheet 1

INVENTOR.
EMANUEL FEINBERG
BY John F. Schmidt
ATTORNEY

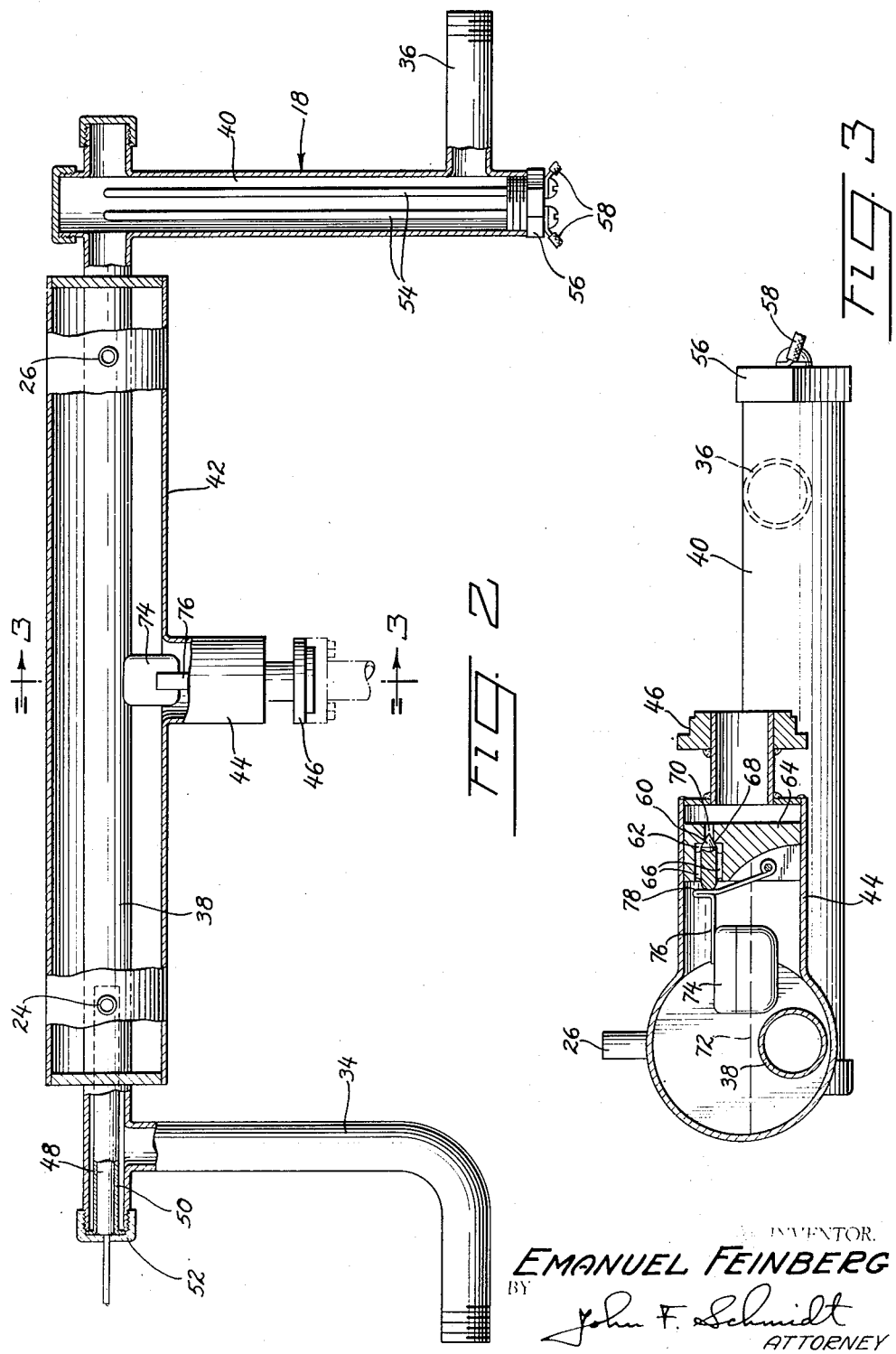

Patented Oct. 5, 1943

2,330,876

UNITED STATES PATENT OFFICE 2,330,876

TEMPERATURE CONTROL APPARATUS

Emanuel Feinberg, Detroit, Mich.

Application January 30, 1942, Serial No. 428,919

5 Claims. (Cl. 257—4)

This invention relates to temperature control apparatus, particularly to apparatus used in controlling within close limits the temperature of a circulating fluid. It has had specific application to the control of the temperature of solutions for photographic work, although it is by no means limited to this application.

It is important in photographic work that the temperature of the various solutions be controlled within very close limits, so that light-sensitive films which have been properly exposed may be subjected to the treating solutions for predetermined lengths of time to obtain the results desired as to density, depth, contrast, and the like. Such control is especially important for the developer solution, inasmuch as, of the solutions normally used to develop films, plates and prints, the developer solution affects the photo-sensitive substance to a greater extent than the others, and its action on that substance varies more with variations in its temperature.

It is the object of this invention to provide temperature control apparatus in which a circulating fluid may be held within very close temperature limits. This is accomplished by circulating the fluid at a very high rate of flow through a heat exchanger in which it is in thermal contact with heating means and cooling means. Thermostatic control means, disposed in the heat exchanger in thermal contact with the circulating fluid, determines whether the fluid shall be heated or cooled.

Heating is provided by any suitable heater, such as an electrical heating element, and cooling is provided by any suitable coolant flowing through the heat exchanger. When the system requirements, as determined by the thermostat, call for cooling, the flow of heat-producing energy to the heater is interrupted and the flow of coolant is unimpeded. When the thermostat calls for heating, valves in the coolant-circulating conduits are closed, and heat-producing energy is supplied to the heater.

Fig. 1 of the drawings shows a refrigerant circuit embodying the temperature control apparatus of this invention.

Fig. 2 is a top plan view, with parts broken away and in section, of the heat exchanger of the invention.

Fig. 3 is a view in section substantially on line 3——3 of Fig. 2; and

Figure 1:
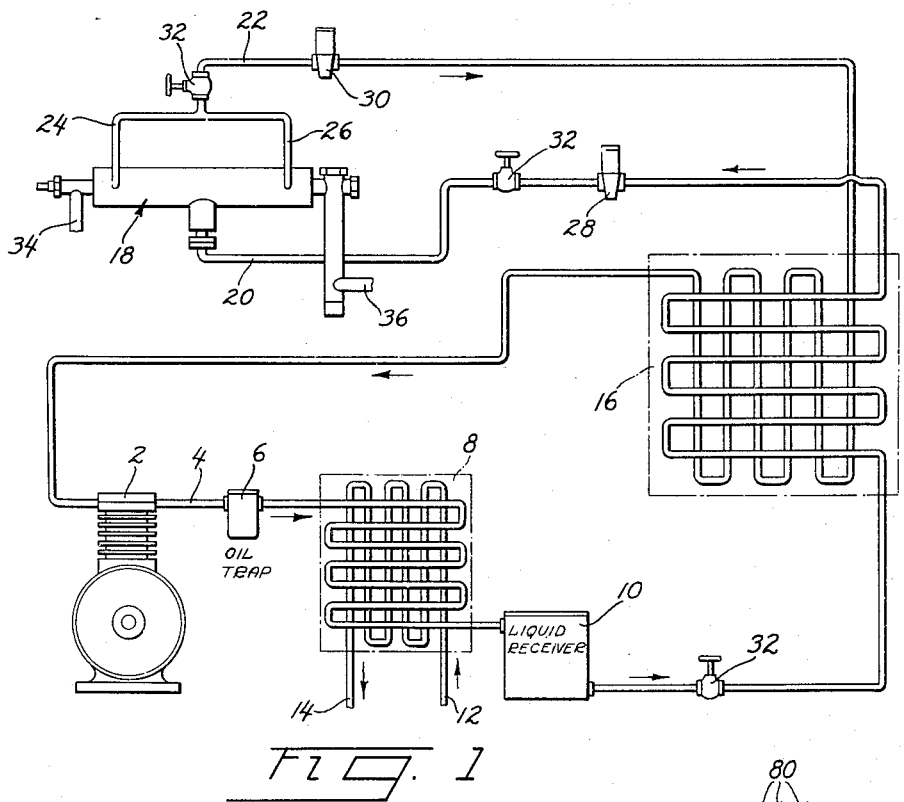

Referring now to Fig. 1 in detail, 2 shows a refrigerant compressor discharging compressed refrigerant gas into a conduit or line 4 which conducts the gas to an oil trap 6. From trap 6 the refrigerant goes to condenser 8 and liquid receiver 10. Condenser 8 may be cooled by water entering at 12 and leaving at 14. From receiver 10, the condensed refrigerant flows to heat interchanger 16, where it is further cooled by thermal contact with gas returning to the compressor. It will, of course, be understood that the condenser 8 and liquid receiver 10 may in actual practice be an integral unit.

From heat interchanger 16, the further cooled refrigerant flows to heat exchanger 18 through supply line 20, and is withdrawn through exhaust line 22 by way of taps 24 and 26, returning as a gas to compressor 2 through heat interchanger 16. A valve 28 is provided in the supply line 20, and a similar valve 30 is provided in the exhaust line 22. Valves 28 and 30 are motor operated and are controlled by the thermostatic means of the system. I prefer to operate valves 28 and 30 by electrical means, such as by solenoids, not shown. A plurality of hand operated valves 32 may be provided at various places in the refrigerant circuit for convenience in isolating portions of the system for cleaning, repairs and the like.

In heat exchanger 18, the coolant or refrigerant is in thermal contact with the fluid the temperature of which it is to be controlled. This fluid is applied to line 34 of the heat exchanger and is withdrawn from line 36 thereof.

In Figs. 2 and 3, heat exchanger 18 is seen to comprise: a conduit made up of a short supply line 34, an elongated portion 38, a heater chamber 40, and the aforesaid short discharge line 36; and a coolant receiver made up of jacket 42 which envelops at least a portion of the said conduit, float valve chamber 44, supply nipple 46, and exhaust taps 24 and 26.

At or near the entrance into the heat exchanger of the fluid to be treated, I have provided a temperature sensitive element 48, which may conveniently be a bulb filled with a fluid which undergoes large volume changes with variations in temperature. Element 48 is in thermal contact with a nipple 50 having its inner end closed, which is held in the end of elongated portion 38 by means of a collar 52 which has threaded engagement with portion 38, as shown. The fluid to be treated flows around nipple 50, exposing it and element 48 to the temperature of the fluid.

As is seen in Fig. 2, supply line 34 joins elongated portion 38 substantially at right angles thereto. Temperature sensitive element 48 lies in the portion 38 right at the outlet of line 34. The abrupt change in direction of the fluid as it flows from line 34 into the portion 38 results in high turbulence, assuring intimate contact of the fluid with nipple 50. Thus the requirements of the fluid are transmitted to element 48 with a minimum of time delay, permitting rapid change from heating to cooling, or vice versa, according to those requirements.

At the opposite end of the conduit, heating chamber 40 is disposed, in which I have placed a heater such as the electrical heating elements 54. Elements 54 may conveniently be any of the encased, refractory-embedded resistor units known to the art. Elements 54 are mounted on a base 56 which has threaded engagement with the conduit. Electrical energy is supplied to the heater elements through leads 58 from any suitable power source.

As is particularly seen in Fig. 3, refrigerant flows through supply nipple 46 to chamber 44, in which I have disposed a valve 60 guided in bore 62 of block 64 by vanes 66. Valve 60 cooperates with seat 68 to close the passage 70 when liquid refrigerant reaches the level indicated by dotted line 72, which is preferably sufficient to cover portion 38 of the fluid conduit. This action of valve 64 is achieved by means of float 74 having pivoted connection to block 64 through arm 76; arm 76 has a flat bearing portion 78 which engages valve 60 to seat it. Although I have shown a float valve in detail, it will be understood that any of a number of types and designs could be used as well as the one shown. It will likewise be understood that the valve may be controlled by means not dependent upon liquid level, although I have indicated such a valve as being preferred.

I have provided two exhaust taps 24 and 26 at the upper side of jacket 42, so that tilting of the heat exchanger about line 3—3 of Fig. 2 will be unlikely to result in "slugs" of liquid refrigerant being drawn from the jacket into the compressor.

Figure 4:
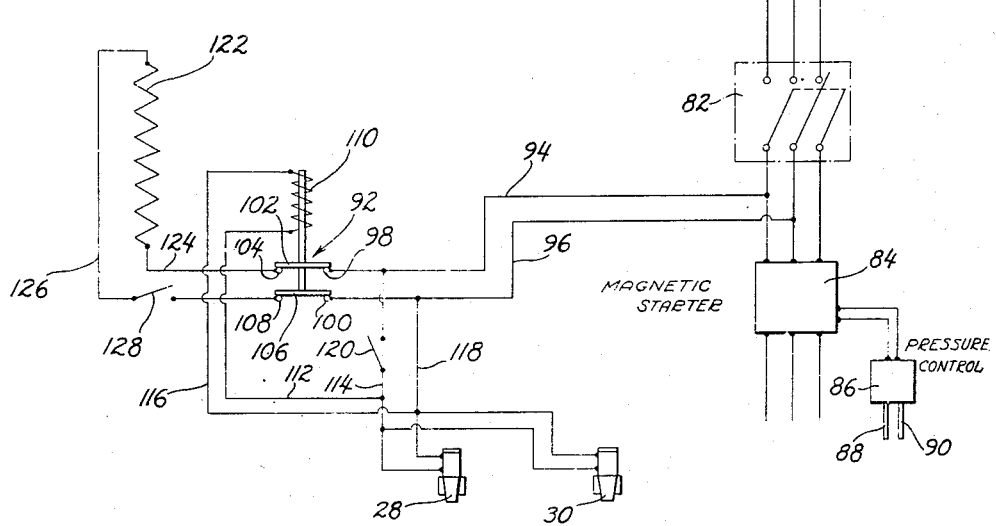
Fig. 4 is a circuit diagram showing the relation of the heater and valve controls to the power source.

In Fig. 4, I have shown the diagram of a control circuit embodying my invention. In this figure, a power source such as the 3-phase line 80 is indicated. A line switch 82 provides means to connect the temperature control apparatus with the power source. A magnetic starter 84 is disposed between switch 82 and the compressor motor, not shown. A low and high pressure control 86, having fluid conduit connections 88 and 90 with the compressor, may be connected to starter 84 to disconnect the power source from the motor if the pressure at a pre-selected point of the refrigerant circuit exceeds a predetermined maximum or falls below a predetermined minimum.

A normally closed contactor 92 is connected to two of the lines of 3-phase power source 80 by wires 94 and 96, which are electrically connected to fixed contacts 98 and 100 respectively of contactor 92. Bridging contact 102 connects fixed contacts 98 and 104, and bridging contact 106 connects fixed contacts 100 and 108. Coil 110 of contactor 92 is connected to wires 94 and 96 through wires 112, 114 and 116, 118 respectively. A switch 120 in wire 114 is actuated by any suitable motor, not shown, controlled by thermostat 48 of Fig. 2. Where thermostat 48 is a fluid filled bulb, this motor may conveniently be any of a number of commercially available satisfactory bellows. Other suitable types of motors adaptable to the type of thermostat used will suggest themselves to those skilled in the art.

The heater of chamber 40 in Fig. 2 is shown in Fig. 4 as a resistor wire 122, connected to fixed contacts 104 and 108 of the contactor by wires 124 and 126 respectively. A switch 128 may be provided, if desired, to disconnect the heater for summer operation.

Solenoid operated valves 28 and 30 are shown as being connected in parallel to lines 114 and 118, being supplied with power through thermostatically operated switch 120.

When thermostat 48 calls for cooling, switch 120 is closed, and current flows from the source through the 3-phase lines 80, switch 82, wire 94, switch 120, wires 114 and 112 to coil 110 of the contactor 92, and wires 116 and 118 to wire 96. The closing of switch 120 also causes current to flow through the coils of solenoid valves 28 and 30 which are connected in parallel to wires 114 and 118. Energizing coil 110 of contactor 92 causes bridging contacts 102 and 106 to be moved out of engagement with fixed contacts 98–104 and 100–108, respectively, to interrupt the circuit to heater 122. Valves 28 and 30 are opened to permit the flow of refrigerant through the heat exchanger 18. When thermostat 48 calls for heating, switch 120 is opened, deenergizing coil 110. The coils of valves 28 and 30 are also deenergized to close those valves. Thus the flow of refrigerant is interrupted. Power flow is then from 3-phase lines 80 through switch 82, wire 94, contact 98, bridging contact 102, contact 104, wire 124, heater coil 122, wire 126, manual switch 128, contact 108, bridging contact 106, contact 100, and wire 96 back to switch 82.

The operation is briefly as follows: With switches 82 and 128 closed, the system is in condition for heating or cooling. If the thermostat 48 calls for cooling, switch 120 is closed, energizing contactor 92 and opening the circuit to the heater. Solenoid operated valves 28 and 30 are open, permitting refrigerant to circulate through the heat exchanger in accordance with the requirements of the system as determined by the float valve. When the system calls for heating, as determined by the thermostat, switch 120 is opened, deenergizing the solenoid actuators of valves 28 and 30, closing the valves. Pressure thereupon builds up in jacket 42, raising the temperature therein. Simultaneously with the closing of valves 28 and 30, contactor 92 is deenergized, completing an electric circuit to resistor 122 of the heater.

The apparatus of my invention has been most successfully applied by circulating the fluid to be treated at a high rate of flow through the conduit. I have operated the apparatus at rates of fluid flow as high as 75 gallons per minute.

It may be pointed out that the apparatus may be operated successfully without valve 28, relying upon valve 30 and the float valve to isolate the refrigerant chamber 42 so as to build up the pressure therein, although somewhat better control is obtainable by the use of both valves 28 and 30. It should likewise be pointed out that I may use a "high side" float valve, in which the level of refrigerant builds up on the high pressure side of the valve to a predetermined minimum before the valve leaves its seat to permit refrigerant to flow into jacket 42.

I claim:

1. A heat exchanger in which a fluid is in thermal contact with a volatile refrigerant, a valve in the line through which refrigerant is supplied to the heat exchanger, a valve in the line through which refrigerant is withdrawn from the heat exchanger, a temperature sensitive element in the heat exchanger in thermal contact with the fluid, a heater in the heat exchanger in thermal contact with the fluid, and means operable by the temperature sensitive element for closing the valves and supplying heat-producing energy to the heater, or for opening the valves and interrupting the flow of heat-producing energy to the heater, according to the requirements of the system as determined by the temperature sensitive element.

2. The invention set forth in claim 1, and a third valve to control the flow of refrigerant to the heat exchanger in accordance with the requirements for cooling as determined by the quantity of refrigerant in the heat exchanger, said valve being independent of said temperature sensitive element.

3. In a heat exchanger, a passage for a fluid to be heated or cooled, a passage for a coolant, said passages being adjacent to provide thermal contact between the fluid and the coolant, a heater in the fluid exit end of the fluid passage, a valve in the line through which coolant is withdrawn from the heat exchanger, a temperature sensitive element in the fluid entrance end of the fluid passage, and means operable by the temperature sensitive element to close the valve and supply heat-producing energy to the heater, or to open the valve and interrupt the supply of energy to the heater.

4. In a heat exchanger, a passage for a fluid the temperature of which is to be controlled, a passage for a coolant, said passages being in thermal contact, a float operated valve to control the supply of coolant to the heat exchanger, a temperature sensitive element in the fluid entrance end of the fluid passage, a heater in the fluid exit end of the fluid passage, and means controlled by the temperature sensitive elements to permit the flow of heat producing energy to the heater and at the same time to stop coolant flow through its passage.

5. A conduit, a jacket surrounding the same, means to force a fluid through the conduit, means to force a coolant through the jacket, a valve in the line through which coolant is supplied to the jacket, a valve in the line through which coolant is withdrawn from the jacket, a temperature sensitive element in the conduit at the fluid entrance end, a float operated valve in the jacket to shut off the flow of coolant into the jacket when the quantity of coolant in the jacket reaches a predetermined value, a heater in the conduit, and means operated by said temperature sensitive element for closing the first two valves and supplying heat producing energy to the heater or for opening said valves and interrupting the flow of energy to the heater.

EMANUEL FEINBERG.